United States Patent
Philipp

(10) Patent No.: US 9,382,388 B2
(45) Date of Patent: Jul. 5, 2016

(54) METHOD FOR PROCESSING OF CARBON DIOXIDE CONTAINED IN AN EXHAUST GAS FLOW

(71) Applicant: COMMERZIALBANK MATTERSBURG IM BURGENLAND AKTIENGESELLSCHAFT, Mattersburg (AT)

(72) Inventor: Franz Josef Philipp, Forchtenstein (AT)

(73) Assignee: COMMERZIALBANK MATTERSBURG IM BURGENLAND AKTIENGESELLSCHAFT, Mattersburg (AT)

( * ) Notice: Subject to any disclaimer, the term of this patent is extended or adjusted under 35 U.S.C. 154(b) by 42 days.

(21) Appl. No.: 14/379,645

(22) PCT Filed: Feb. 13, 2013

(86) PCT No.: PCT/AT2013/050037
§ 371 (c)(1),
(2) Date: Aug. 19, 2014

(87) PCT Pub. No.: WO2013/123539
PCT Pub. Date: Aug. 29, 2013

(65) Prior Publication Data
US 2015/0018536 A1     Jan. 15, 2015

(30) Foreign Application Priority Data
Feb. 20, 2012 (AT) .................................. A 204/2012

(51) Int. Cl.
*B01D 53/62* (2006.01)
*C08H 7/00* (2011.01)

(52) U.S. Cl.
CPC ........ *C08H 6/00* (2013.01); *B01D 53/62* (2013.01); *Y02C 10/04* (2013.01)

(58) Field of Classification Search
CPC ............ C07G 1/00; B01D 53/62; Y02C 10/04
See application file for complete search history.

(56) References Cited

U.S. PATENT DOCUMENTS

| | | | |
|---|---|---|---|
| 6,387,212 B1 * | 5/2002 | Christian | ................ C01F 11/18 162/181.2 |
| 6,387,337 B1 * | 5/2002 | Pennline | ................ B01D 53/08 422/216 |

(Continued)

*Primary Examiner* — Liam J Heincer
(74) *Attorney, Agent, or Firm* — Lucas & Mercanti, LLP; Klaus P. Stoffel

(57) ABSTRACT

A method for processing carbon dioxide contained in an exhaust gas flow. The exhaust gas flow is brought in contact in a drying and cooling chamber with a moistened porous silicate material and admixed aluminum hydroxide and/or hydrated aluminum oxide and/or optionally other metal oxidizers to produce a basic aqueous medium and to destabilize the carbon dioxide, and cooled. The amount of aluminum hydroxide and/or hydrated aluminum oxide to be added is controlled via a continuous pH value measurement, after which the aqueous medium is fed to a subsequent prechamber, which is supplied with material containing oxidizable alkaline earth and/or heavy metal, in which neutralization of the aqueous medium containing ionized carbon occurs. The formed alkaline earth and/or heavy metal oxide is discharged from the prechamber and the aqueous medium containing ionized carbon is then fed to a main chamber equipped with material consisting of and/or containing organic carbon compounds.

9 Claims, 3 Drawing Sheets

(56) References Cited

U.S. PATENT DOCUMENTS

| | | | | |
|---|---|---|---|---|
| 6,537,348 B1* | 3/2003 | Hirano | ............... | B01D 53/02 95/114 |
| 7,247,601 B1* | 7/2007 | Hills | ............... | B01J 20/041 502/407 |
| 8,377,408 B2* | 2/2013 | Dickinson, III | ............... | B82Y 30/00 423/445 B |
| 8,828,338 B2* | 9/2014 | Lujano | ............... | C01D 7/00 423/157 |
| 2004/0219090 A1* | 11/2004 | Dziedzic | ............... | B01D 53/229 423/437.1 |
| 2004/0228788 A1* | 11/2004 | Nagai | ............... | B01D 53/62 423/432 |
| 2006/0133982 A1* | 6/2006 | Kinloch | ............... | B82Y 30/00 423/447.3 |
| 2008/0121105 A1* | 5/2008 | Schubert | ............... | B01D 53/02 95/139 |
| 2009/0120288 A1* | 5/2009 | Lackner | ............... | B01D 53/0462 95/68 |
| 2010/0150802 A1* | 6/2010 | Gilliam | ............... | B01D 53/62 423/220 |
| 2010/0229725 A1* | 9/2010 | Farsad | ............... | B01D 53/1456 96/74 |
| 2011/0256049 A1* | 10/2011 | Dickinson, III | ............... | B82Y 30/00 423/445 R |
| 2011/0277670 A1* | 11/2011 | Self | ............... | B01D 61/00 106/638 |
| 2012/0189529 A1* | 7/2012 | Wakimoto | ............... | B01D 53/18 423/432 |
| 2012/0211421 A1* | 8/2012 | Self | ............... | B01D 53/62 210/640 |
| 2012/0238006 A1* | 9/2012 | Gartner | ............... | B01D 53/1475 435/266 |
| 2014/0338255 A1* | 11/2014 | Philipp | ............... | B09B 3/005 44/595 |

\* cited by examiner

METHOD FOR PROCESSING OF CARBON DIOXIDE CONTAINED IN AN EXHAUST GAS FLOW

The present application is a 371 of International application PCT/AT2013/050037, filed Feb. 13, 2013, which claims priority of AT A204/2012, filed Feb. 20, 2012, the priority of these applications is hereby claimed and these applications are incorporated herein by reference.

BACKGROUND OF THE INVENTION

The present invention concerns a method for processing of carbon dioxide $CO_2$ contained in an exhaust gas flow to a product suitable for energy production.

SUMMARY OF THE INVENTION

This processing is achieved according to the invention in that
a) the exhaust gas flow is brought into contact in a drying and cooling chamber with a moistened, porous, silicate material and admixed aluminum hydroxide. and/or hydrated aluminum oxide to produce a basic, aqueous medium and to destabilize carbon dioxide $CO_2$ and then cooled, the mixture of aluminum hydroxide and/or hydrated aluminum oxide to be added being controlled by continuous pH value measurement,
b) the aqueous medium is fed to a subsequent prechamber, which is supplied with oxidizable material containing alkaline earth and/or heavy metal, in which oxidation of alkaline earth and/or heavy metal occurs with accompanying neutralization of the aqueous medium containing ionized carbon and formed alkaline earth and/or heavy metal oxide is discharged from the prechamber, in which oxidizable material containing alkaline earth and/or heavy metal is simultaneously supplied as a function of continuous measurement, and
c) the aqueous medium containing ionized carbon C is then fed to a main chamber equipped with material consisting of organic carbon compounds and/or containing organic carbon compounds, in which polyreactions occur with organic carbon compounds with participation of ionized carbon C to form. a carbon-enriched product.

BRIEF DESCRIPTION OF THE DRAWING

FIG. 2$b$ shows a graph of average $O_2$ and $CO_2$ at the output of the supply chamber.
FIG. 2$c$ shows a graph of average $O_2$, and $CO_2$ at the output of the main chamber.

DETAILED DESCRIPTION OF THE INVENTION

Figure 1:
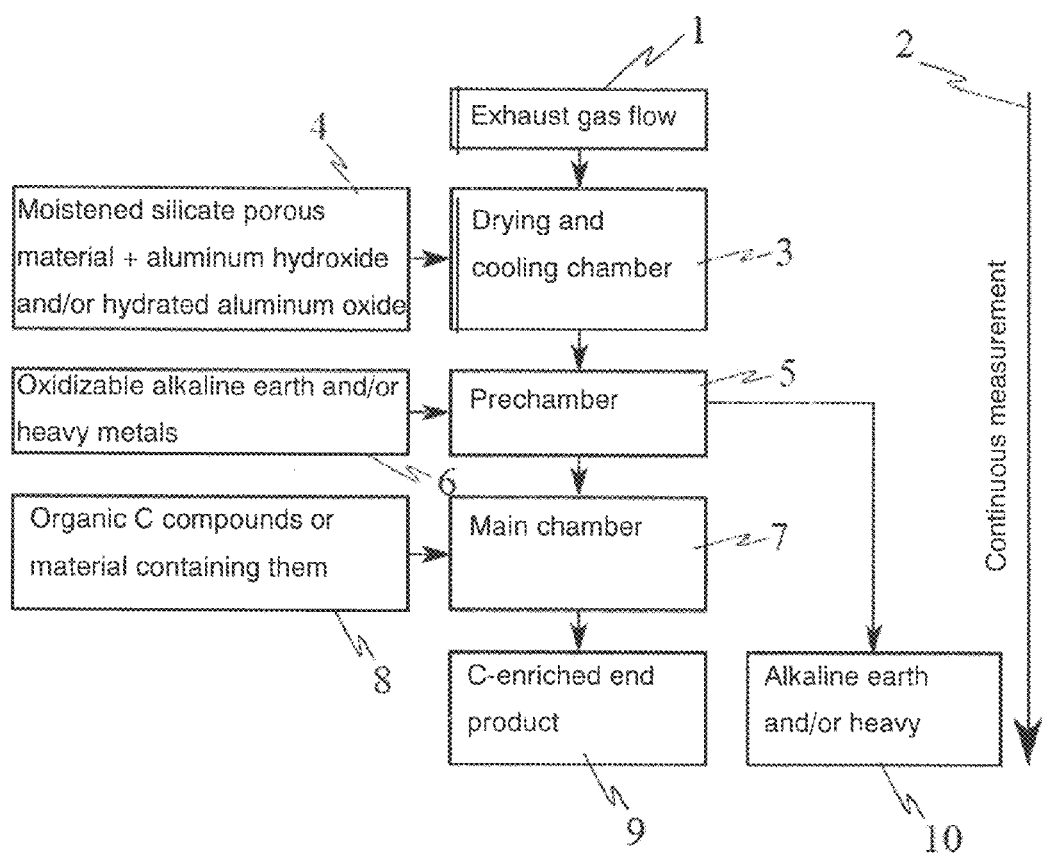
FIG. 1 shows a flow chart of the inventive method.
Figure 2A:
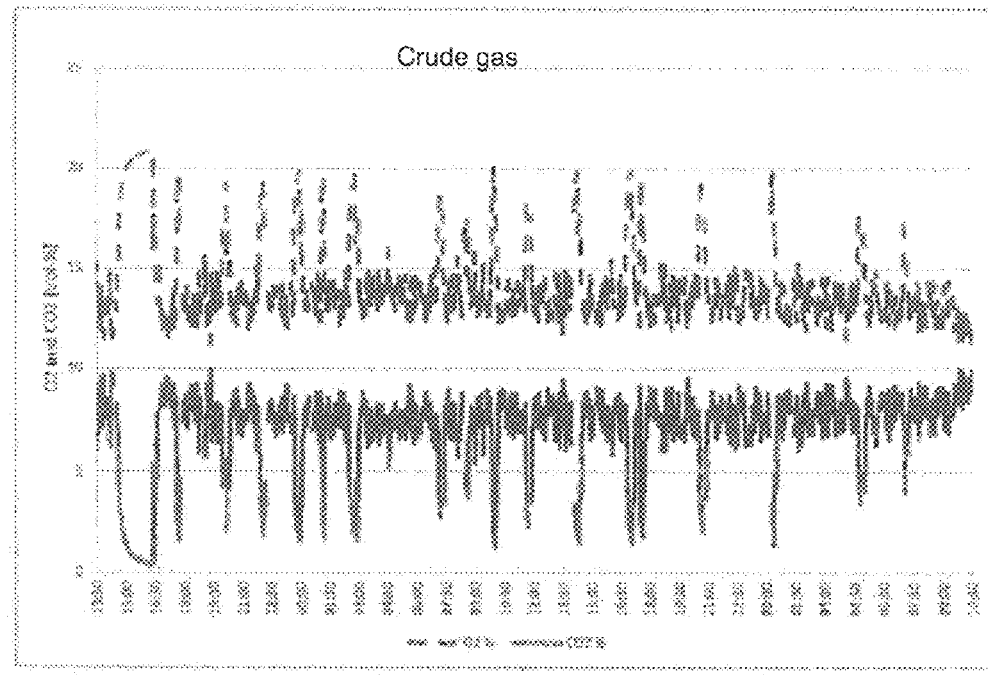
FIG. 2$a$ shows a graph of average initial $O_2$ and $CO_2$ of the exhaust gas.
Figure 2B:
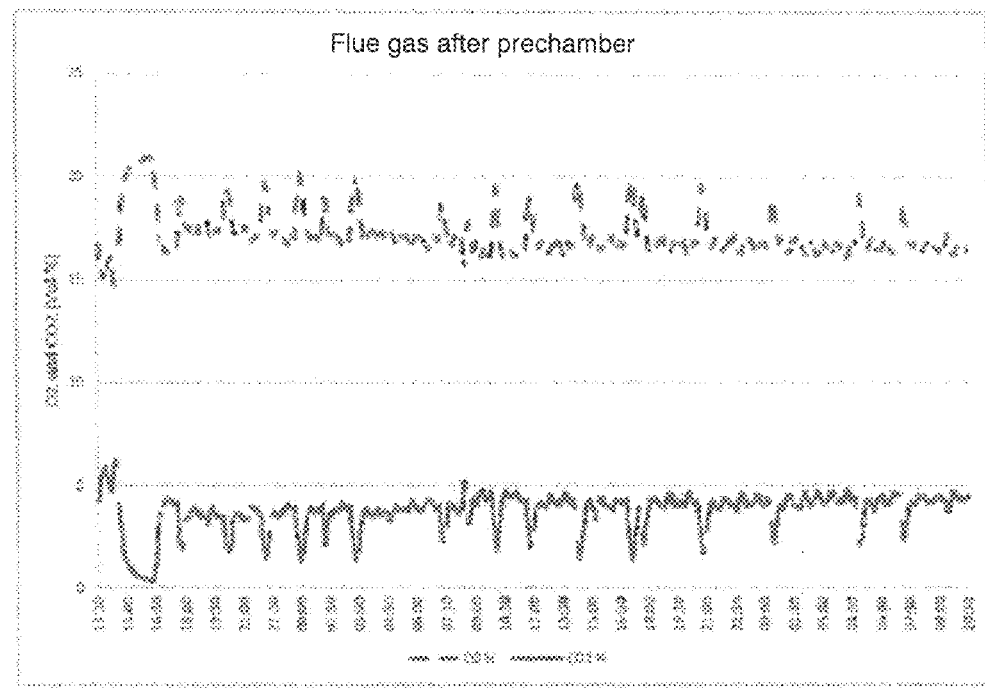
Figure 2C:
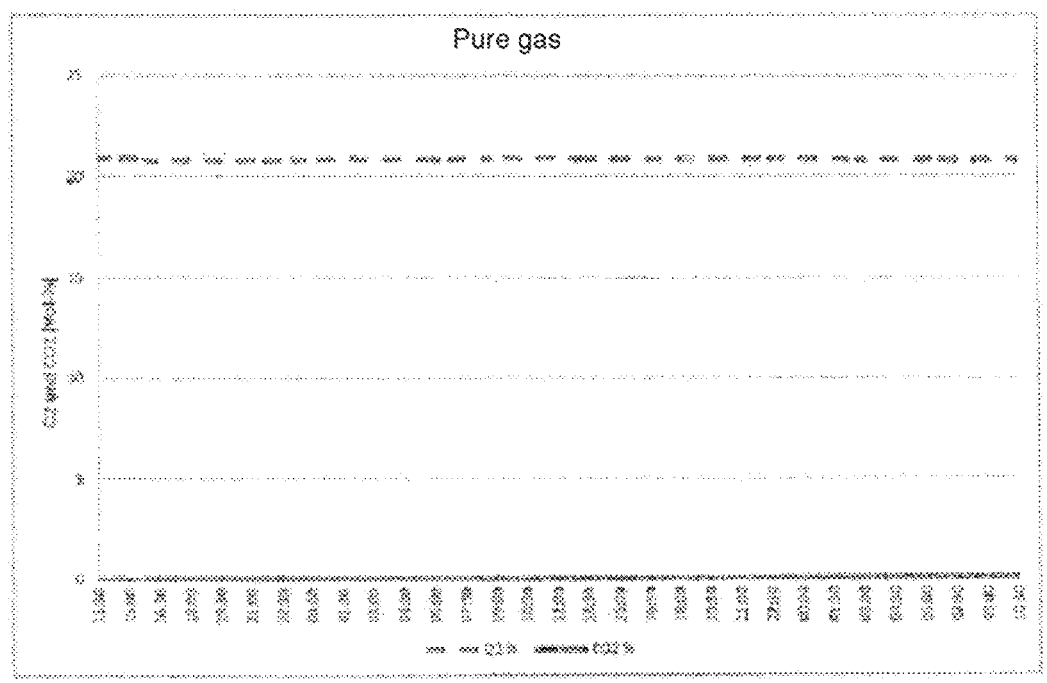

The invention is further explained below with reference to the drawing in which FIG. 1 shows a flow chart according to the invention of a method for processing of carbon dioxide $CO_2$ contained in an exhaust gas flow by means of a three-chamber system to a product suitable for energy production and FIG. 2$a$ shows the average initial content of O2 [sic, $O_2$] and CO2 [sic, $CO_2$] of the exhaust gas flow being processed, FIG. 2$b$ shows the average content of O2 [sic, $O_2$] and CO2 [sic, $CO_2$] at the output of the supply chamber apparent from the flow chart according to FIG. 1 and FIG. 2$c$ shows the average content of O2 [sic, $O_2$] and CO2 [sic, $CO_2$] at the output of the main chamber apparent from the flow chart according to FIG. 1, in each case over a measurement period of 3 days.

It is initially stated that the individual components of the employed materials and the medium present in the corresponding process steps are subject to continuous measurement 2 during the entire process, in which case material feed to the corresponding process chambers is controlled, as required or as a function of measurement results. For example, the amount of aluminum hydroxide and/or hydrated aluminum oxide to be added is controlled via a continuous pH measurement 2.

In this case the exhaust gas flow 1, for example, crude gas from an incinerator, usually with a pH value of about 4 and with a temperature in the range from 150 to 170° C., in modern incinerators below 150° C., during passage through a drying and cooling chamber 3 optionally consisting of several chamber units, which is supplied with moistened, silicate, porous material and admixed aluminum hydroxide and/or hydrated aluminum oxide 4 and/or other metal oxidizers, is cooled to a temperature of 30-50° C., in which case a basic, aqueous medium is generated and the contained carbon dioxide $CO_2$ is destabilized. The moistened, silicate, porous material 4 is pumice, foam lava and/or perlite in granulated form with a moisture content of 15 to 30% referred to the total dry weight of the silicate material 4. The moistened, silicate, porous material 4 is then dried or its moisture absorbed by exhaust gas flow 1 so that it is cooled. The aqueous medium generated in the drying and cooling chamber 3 is brought to a pH value between 10 and 13 by means of aluminum hydroxide and/or hydrated aluminum oxide. The aqueous medium formed in the drying and cooling chamber 3, in which the destabilized carbon dioxide $CO_2$ present in ionized form is contained, is fed to a subsequent prechamber 5, which is supplied material containing oxidizable alkaline earth and/or heavy metal, in which case oxidation of alkaline earth and/or heavy metal 6 occurs with accompanying neutralization of the aqueous medium containing ionized carbon C. The oxidizable material 6 containing alkaline earth metal, preferably calcium and/or heavy metal is used in fine-granular form as metal, for example, Fe dust, fly ash, hydrated lime, etc. An alkaline earth and/or heavy metal oxide 10 formed during neutralization is discharged subsequently as byproducts from prechamber 5, in which case oxidizable material 6 containing alkaline earth and/or heavy metal is supplied as a function of continuous measurements 2. Following prechamber 5, the medium ordinarily has a pH value of 6. The aqueous medium containing ionized carbon C is then fed to a main chamber 7 equipped with a material 8 consisting of organic carbon compounds and/or containing organic carbon compounds, in which the material 8 can be lignin, lignin derivatives, recovered paper stock and/or plastic materials, pulp or waste substances, etc. With participation of ionized carbon C polyreactions (chain lengthening) with organic carbon compounds occurs to form a carbon enriched end product 9. The polyreactions occurring in the main chamber 7 occur at temperatures between 5 and 80° C., preferably between 30-60° C. and especially 40-45° C. and under a pressure between 0.1 and 10 bar, preferably between 0.1 and 0.7 bar or 5 to 8 bar.

A temperature control arranged in the drying and cooling chamber 3 serves to separate the substances into the corresponding substance-specific state (solid, liquid, gas) in order to produce new compounds.

It is generally observed that under pressure the addition process of carbon C to the moistened silicate porous material 4 occurs more quickly and significantly greater addition also occurs. Moreover, additional substance mixtures can be fed to main chamber 7 as reaction accelerators in order to configure the reaction capacity of the substances and the temperatures in the main chamber 7 so that optimal processing of the carbon dioxide $CO_2$ contained in the exhaust gas flow 1 occurs and a C-enriched end product 9 is formed.

The method according to the invention is further explained by means of a preferred practical example.

Wood waste is used as raw material source for the exhaust gas flow. The crude gas originating from incineration of ground wood waste, shows an average content of $O_2$ between 11.5 and 14 vol % and a $CO_2$ content between 7 and 9 vol %, is fed to a drying and cooling chamber with a temperature of about 150° C., in which the exhaust gas flow is cooled to a temperature of ≤40° C., preferably about 30° C. and which is supplied with pumice as porous silicate material with a moisture content to 60%, referred to the dry weight, with admixed aluminum hydroxide and/or hydrated oxide, said aluminum compounds occurring during KOH production. The exhaust gas flow absorbs the moisture of the pumice, in which case the exhaust gas flow is cooled. At the same time an aqueous medium is generated in the drying and cooling chamber to form a stable suspension of aluminum compounds in water. In the aqueous medium, which has a pH value of roughly neutral to more strongly basic, pH 10 to 13, the carbon dioxide ($CO_2$) contained in it is ionized and destabilized, in which the aqueous medium is cooled to a temperature between 12 and 13° C. up to its output from the drying and cooling chamber.

The aqueous medium is sent from the drying and cooling chamber to a downline prechamber, which is supplied with iron shavings as oxidizable material, in which the ratio of oxidizable material to liquid of the aqueous medium is about 1:7 wt %. The iron shavings are oxidized during simultaneous neutralization of the prechamber medium by the oxygen coming from the ionized and destabilized carbon dioxide. At the output of the prechamber the aqueous medium has an average $O_2$ content of about 16-17 vol % and a $CO_2$ content of about 3.5-4 vol % and a value of about 6.

For further treatment the aqueous medium containing carbon is sent to a main chamber, which is equipped with materials containing organic carbon compounds. Recovered paper stock containing lignin is preferably used here, which can be equally replaced by any plastic materials, pulp and/or waste substances containing aliphatic and/or aromatic carbon compounds. With participation of the ionized carbon-containing aqueous medium, polyreactions occur in the main chamber along with polymerizations and polycondensations with the organic with the organic carbon compounds of the recovered paper stock situated in it to form a carbon-enriched end product, which has a silicate fraction of about 20-25 vol % as support skeleton. The polyreaction in the main chamber preferably occurs at a temperature between 40 and 45° C. under a pressure of 7 to 8 bar. Under these pressure and temperature conditions the silicate fraction of the carbon-rich end product is finally also separable, which represents a basic raw material that can be used in a variety of ways. Through this processing of the exhaust gas flow a pure gas is finally achieved at the output from the main chamber, which has an average $O_2$ content of 22 vol % and a $CO_2$ content of 0.2 vol %.

By continuous measurement of the individual process parameters, like pressure, temperature, material amounts and compositions in the individual process steps optimization of the process and result is guaranteed.

The invention claimed is:

1. A method for processing carbon dioxide contained in an exhaust gas flow to a product suitable for energy production, the method comprising the steps of:
   a) bringing the exhaust gas flow in contact in a drying and cooling chamber with a moistened porous silicate material and an admixed aluminum hydroxide and/or hydrated aluminum oxide to form a basic aqueous medium containing ionized carbon and to destabilize carbon dioxide, and cooled, wherein the amount of aluminum hydroxide and/or hydrated aluminum oxide to be added is controlled via a continuous pH value measurement;
   b) feeding the aqueous medium to a subsequent prechamber, which is supplied with material containing oxidizable alkaline earth and/or heavy metal, wherein oxidation of alkaline earth and/or heavy metal occurs with accompanying neutralization of the aqueous medium containing ionized carbon, and the alkaline earth and/or heavy metal oxide formed as a result is discharged from the prechamber, wherein material containing oxidizable alkaline earth and/or heavy metal is simultaneously supplied as a function of continuous measurement; and
   c) feeding the aqueous medium containing ionized carbon to a main chamber supplied with material consisting of organic carbon compounds and/or containing organic carbon compounds, in which polyreactions with organic carbon compounds occur with participation of the ionized carbon to form a carbon-enriched end product.

2. The method according to claim 1, including using pumice, foam lava and/or perlite in granular form with a moisture content of 15-30% referred to dry total weight of the silicate material as the moistened, porous silicate material.

3. The method according to claim 1, including cooling the exhaust gas flow entering the drying and cooling chamber to 30-50° C.

4. The method according to claim 1, including bringing the aqueous medium generated in the drying and cooling chamber to a pH value between 10 and 13.

5. The method according to claim 1, wherein the material containing oxidizable alkaline earth and/or heavy metal is used in fine granular form as metal.

6. The method according to claim 5, wherein the metal is Fe dust, fly ash, or hydrated lime.

7. The method according to claim 1, including using lignin, lignin derivative, recovered paper stock and/or plastic materials as the material consisting of organic compounds and/or containing organic compounds that is supplied to the main chamber.

8. The method according to claim 1, wherein the polyreactions in the main chamber occur at temperatures between 5 and 80° C.

9. The method according to claim 1, wherein the polyreactions in the main chamber occur under a pressure between 9.8 and 196 kPa.

* * * * *